(12) United States Patent
Saberan

(10) Patent No.: US 7,506,936 B2
(45) Date of Patent: Mar. 24, 2009

(54) MOVEABLE HEADREST ASSEMBLY FOR A VEHICLE SEAT

(75) Inventor: Mohammad Saberan, New Baltimore, MI (US)

(73) Assignee: Lear Corporation, Southfield, MI (US)

( * ) Notice: Subject to any disclaimer, the term of this patent is extended or adjusted under 35 U.S.C. 154(b) by 36 days.

(21) Appl. No.: 11/071,355

(22) Filed: Mar. 3, 2005

(65) Prior Publication Data

US 2006/0197366 A1 Sep. 7, 2006

(51) Int. Cl.
A47C 7/36 (2006.01)
A47C 7/38 (2006.01)
B60N 2/30 (2006.01)
B60N 2/48 (2006.01)

(52) U.S. Cl. .................... 297/410; 297/378.12
(58) Field of Classification Search ............... 297/410, 297/378.1, 378.12, 378.13, 378.14
See application file for complete search history.

(56) References Cited

U.S. PATENT DOCUMENTS

| | | | | |
|---|---|---|---|---|
| 3,563,602 A * | 2/1971 | Ohta et al. | ............... | 297/410 |
| 4,222,608 A * | 9/1980 | Maeda | ............... | 297/410 |
| 4,483,565 A * | 11/1984 | Terui et al. | ............... | 297/410 |
| 4,545,618 A * | 10/1985 | Kitamura | ............... | 297/410 |
| 4,568,123 A * | 2/1986 | Yasui et al. | ............... | 297/410 |
| 4,577,904 A * | 3/1986 | Wiese et al. | ............... | 297/410 |
| 4,604,777 A * | 8/1986 | Meeks | ............... | 297/410 X |
| 4,657,297 A * | 4/1987 | Ishibashi | ............... | 297/410 X |
| 4,657,425 A * | 4/1987 | Takahashi | ............... | 297/410 X |
| 4,765,683 A * | 8/1988 | Hattori | ............... | 297/410 |
| 5,156,440 A * | 10/1992 | Vidwans | ............... | 297/410 |
| 5,529,379 A * | 6/1996 | Stocker | ............... | 297/410 |
| 5,711,579 A * | 1/1998 | Albrecht | ............... | 297/410 |
| 5,823,623 A * | 10/1998 | Beck | ............... | 297/410 |
| 5,860,703 A * | 1/1999 | Courtois et al. | ............... | 297/410 |
| 5,895,094 A * | 4/1999 | Mori et al. | ............... | 297/410 |
| 5,918,940 A * | 7/1999 | Wakamatsu et al. | ............... | 297/410 |
| 6,012,777 A * | 1/2000 | Wege et al. | ............... | 297/410 |
| 6,062,645 A * | 5/2000 | Russell | ............... | 297/410 |
| 6,074,011 A | 6/2000 | Ptak et al. | | |
| 6,099,077 A * | 8/2000 | Isaacson | ............... | 297/410 |
| 6,390,558 B2 * | 5/2002 | Fischer et al. | ............... | 297/410 |
| 6,454,356 B1 * | 9/2002 | Yamada | ............... | 297/410 |
| 6,709,051 B2 * | 3/2004 | Schambre et al. | ... | 297/378.12 X |
| 6,742,846 B1 * | 6/2004 | Isaacson | ............... | 297/410 |
| 6,761,409 B2 * | 7/2004 | Ford | ............... | 297/410 |
| 6,969,118 B2 * | 11/2005 | Yamada | ............... | 297/410 |
| 7,059,681 B2 * | 6/2006 | Kubo | ............... | 297/410 |
| 7,108,327 B2 * | 9/2006 | Locke et al. | ............... | 297/410 |

(Continued)

FOREIGN PATENT DOCUMENTS

DE 3843616 A1 * 6/1990 ............... 297/410

(Continued)

Primary Examiner—Rodney B. White
(74) Attorney, Agent, or Firm—Brooks Kushman P.C.

(57) ABSTRACT

A vehicle seat assembly for a motor vehicle. The vehicle seat assembly includes a seat back having a frame, a moveable head restraint arrangement, and a latching member. The moveable head restraint arrangement includes a headrest support disposed proximate the frame and a headrest assembly moveably disposed on the headrest support. The latching member is disposed in the headrest assembly. The head rest assembly moves linearly toward the seat back when the latching member is spaced apart from the headrest support.

20 Claims, 4 Drawing Sheets

U.S. PATENT DOCUMENTS

| | | | |
|---|---|---|---|
| 7,121,625 B2 * | 10/2006 | Malsch et al. | 297/410 |
| 7,140,687 B2 * | 11/2006 | Hoekstra et al. | 297/410 |
| 7,159,946 B2 * | 1/2007 | Gurtatowski et al. | 297/410 |
| 2001/0002764 A1 | 6/2001 | Fischer et al. | |
| 2001/0013718 A1 * | 8/2001 | Beck | 297/410 |
| 2003/0222491 A1 * | 12/2003 | Isaacson | 297/410 |
| 2003/0222492 A1 * | 12/2003 | Nemoto et al. | 297/410 |
| 2003/0222493 A1 * | 12/2003 | Ozaki | 297/410 |
| 2005/0082893 A1 * | 4/2005 | Akehi et al. | 297/410 |
| 2006/0108851 A1 * | 5/2006 | Tsutsui et al. | 297/410 |
| 2007/0145803 A1 * | 6/2007 | Kopetzky et al. | 297/410 |

FOREIGN PATENT DOCUMENTS

| | | |
|---|---|---|
| DE | 197 30 911 A1 | 1/1999 |
| DE | 198 32 902 A1 | 1/2000 |
| DE | 100 35 972 A1 | 2/2001 |
| DE | 100 43 923 | 4/2002 |
| DE | 699 02 150 T2 | 11/2002 |
| GB | 2 318 285 A | 4/1998 |

* cited by examiner

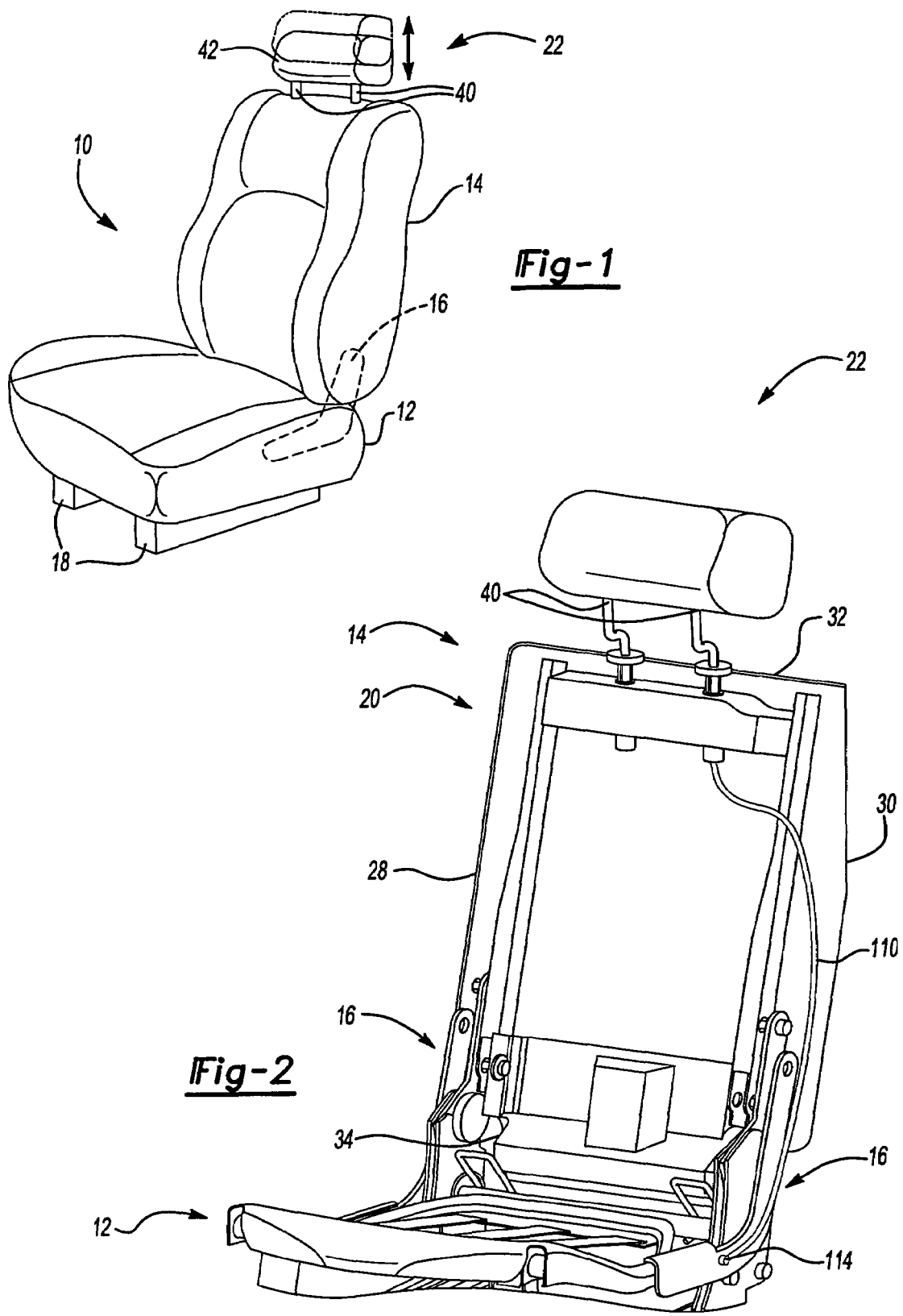

MOVEABLE HEADREST ASSEMBLY FOR A VEHICLE SEAT

BACKGROUND OF THE INVENTION

1. Field of the Invention

The present invention relates to a vehicle seat having a moveable headrest assembly, and more particularly to a headrest assembly that may be actuated when a seat back is folded.

2. Background Art

Vehicle seats having moveable headrest arrangements are known in the vehicle seating art, such as the headrest arrangement disclosed in U.S. Pat. No. 6,604,788.

SUMMARY OF THE INVENTION

According to one aspect of the present invention, a vehicle seat assembly is provided. The vehicle seat assembly includes a seat back having a frame, a moveable head restraint arrangement, and a latching member. The moveable head restraint arrangement has a headrest support disposed proximate the frame and a headrest assembly moveably disposed on the headrest support. The latching member is disposed in the headrest assembly. The headrest assembly moves linearly toward the seat back when the latching member is spaced apart from the headrest support.

The headrest assembly may include a headrest frame and a guide fixedly attached to the headrest frame. The headrest frame may include a recess. The guide may be at least partially disposed in the recess. A spring may be disposed in the recess and may be configured to bias the headrest assembly toward the seat back.

The latching member may be disposed proximate the guide. The guide may include a side opening. At least a portion of the latching member may extend through the side opening to engage the headrest support.

The headrest support may include a notch. The latching member may be configured to selectively engage the notch to inhibit movement of the headrest assembly toward the seat back. The headrest support may include a linear upper portion having a center axis. The notch may include an upper surface and a lower surface. The lower surface may be disposed at a greater angle from the center axis from the upper surface.

The vehicle seat assembly may include a seat bottom pivotally attached to the seat back and a cable. The cable may have a first and second ends. The first end may be disposed proximate the latching member. The second end may be disposed proximate the seat bottom or may be disposed proximate a portion of a pivot mechanism. The cable may actuate the latching member away from the headrest support when the seat back is folded toward the seat bottom.

The headrest assembly may include a manual release mechanism adapted to actuate the latching mechanism away from the headrest support.

According to another aspect of the present invention, a vehicle seat assembly is provided. The vehicle seat assembly includes a seat bottom, a seat back, a pivot mechanism, a moveable head restraint arrangement, a latching member, and a cable. The pivot mechanism is configured to allow the seat back to pivot relative to the seat bottom. The moveable head restraint arrangement includes a headrest support disposed proximate the seat back and a headrest assembly moveably disposed on the headrest support. The latching member is disposed proximate the headrest assembly. The cable is attached to the latching member at a first end and is attached to a portion of the pivot mechanism disposed proximate the seat bottom at a second end. The latching member moves away from the headrest support and the headrest assembly moves toward the seat back when the seat back is folded toward the seat bottom.

The headrest assembly may include a headrest frame, a guide and a spring. The guide may be fixedly attached to the headrest frame. The spring may have a first spring end and a second spring end. The first spring end may be disposed proximate a portion of the headrest support that extends through the guide. The second end may be disposed proximate the guide. The spring may exert a biasing force to actuate the headrest assembly toward the seat back.

The headrest support may include a headrest frame having a recess and a tension spring. The recess may include an end surface. The tension spring may have a first end and a second end. The first end may be disposed proximate the end surface. The second end may be disposed proximate the headrest support. The tension spring may exert a biasing force to actuate the headrest assembly toward the seat back.

The headrest support may include a notch configured to inhibit movement of the headrest assembly toward the seat back when the latching mechanism engages the notch. The notch may permit movement of the headrest assembly away from the seat back.

According to another aspect of the present invention, a vehicle seat assembly is provided. The vehicle seat assembly includes a seat bottom, a seat back, a moveable head restraint arrangement, a latching member and a cable. The moveable head restraint arrangement has a headrest assembly and a headrest support. The headrest support has a lower portion disposed proximate the seat back and an upper portion connected to the headrest assembly. The latching member is disposed proximate the headrest assembly. The cable is attached to the latching member at a first end and attached to the seat bottom at a second end. The headrest assembly moves linearly along the upper portion toward the seat back when the seat back is folded the seat bottom.

The headrest support may include a set of notches adapted to receive the latching member. Each member of the set of notches may be spaced apart from another member of the set of notches to allow the headrest assembly to be selectively positioned when the headrest assembly is moved away from the seat back.

A release mechanism may be provided that includes a release rod pivotally disposed on headrest assembly and a release button. The release rod may move the latching member away from the headrest support when the release button is actuated.

BRIEF DESCRIPTION OF THE DRAWINGS

FIG. 1 is a perspective view of a vehicle seat assembly having a seat back.

FIG. 2 is a fragmentary perspective view of the seat back shown in FIG. 1.

DETAILED DESCRIPTION OF THE EMBODIMENT(S)

Figure 3A:
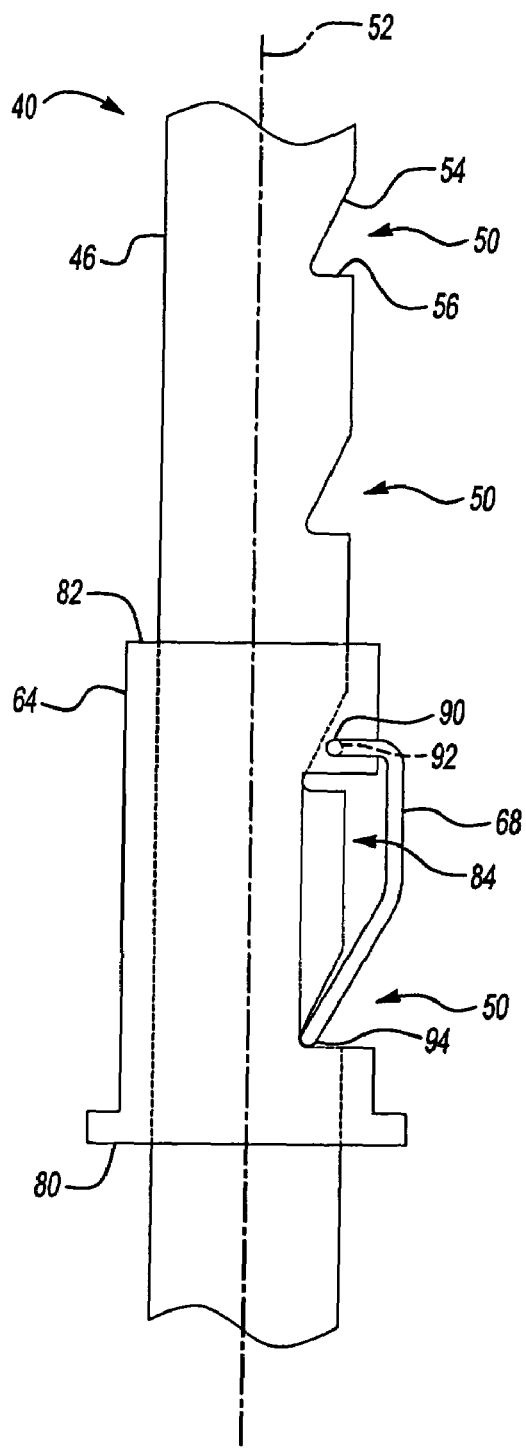
FIGS. 3a and 3b are a perspective view of a head restraint arrangement having a headrest assembly.

Certain terminology presented below is used for convenience in reference only and is not intended to be limiting.

More specifically, directional language such as "left", "right", "above", "below", "upper", "lower" and words of similar import designate directions shown in the drawings. Such directional terminology is used for clarity and is not intended to strictly limit the orientation of any aspect of the invention to a particular plane or direction.

Referring to FIG. 1, a vehicle seat assembly 10 is shown. The vehicle seat assembly 10 includes a seat bottom 12 and a seat back 14. The vehicle seat assembly 10 may be disposed in any suitable seating location of the vehicle. For example, the vehicle seat assembly 10 may be a front seat or may be disposed behind the front seat, such as in a second or third seating row of the vehicle.

The seat back 14 may be pivotally connected to the seat bottom 12 with one or more pivot mechanisms 16. For example, a pivot mechanism 16 may be disposed on opposite sides the vehicle seat assembly 10 to allow the seat back 14 to pivot with respect to the seat bottom 12. In addition, the seat bottom 12 may be attached to a vehicle floor and/or to seat adjuster mechanisms 18 that enable lateral and/or vertical movement of the seat bottom 12 with respect to the vehicle floor.

Referring to FIG. 2, the seat back 14 is shown in more detail. The seat back 14 includes a frame 20 and a head restraint arrangement 22.

The frame 20 may have any suitable configuration. In the embodiment shown in FIG. 2, the frame 20 includes first and second side supports 30,32 and first and second cross members 34,36. The first and second cross members 34,36 extend laterally to connect the first and second side supports 30,32. The side supports 30,32 and cross members 34,36 may be separate components that are joined in any suitable manner, such as by welding, fasteners, or an adhesive. Alternatively, the side supports 30,32 and cross members 34,36 or any combinations thereof may be integrally formed.

The head restraint arrangement 22 includes one or more headrest supports 40 and a head restraint or headrest assembly 42. The headrest assembly 42 is adapted to move between an extended position shown in phantom lines in FIG. 1 and a retracted position shown in solid lines in which the headrest assembly 42 is disposed proximate or closer to the seat back 14. Moreover, the headrest assembly 42 may be selectively positioned between the extended and retracted positions as discussed in more detail below.

The headrest support 40 may have any suitable configuration. In the embodiment shown in FIG. 2, two headrest supports 40 are provided. Alternatively, the headrest supports 40 may be coupled in a generally U-shaped arrangement. The headrest support 40 may be made of any suitable material, such as a metal, and may have a tubular configuration.

Each headrest support 40 may include a lower portion 44 and a upper portion 46. The lower and upper portions 44,46 as shown are generally linear and are angled relative to each other. Alternatively, the lower and upper portions 44,46 may be coaxially formed or may be non-linear. The lower and upper portions 44,46 may be integrally formed or may be separate components assembled in any suitable manner, such as by welding, fasteners, or an adhesive.

The lower portion 44 is fixedly positioned relative to the seat back 14. The lower portion 44 may be secured to a portion of the vehicle seat assembly 10 in any suitable manner, such as by attaching the lower portion 44 to part of the frame 20. In the embodiment shown, the lower portion 44 is secured to the first cross member 32. Alternatively, an intermediate component, such as a bracket or sleeve, may be used to couple the lower portion 44 to a portion of the vehicle seat assembly 10.

Figure 3B:
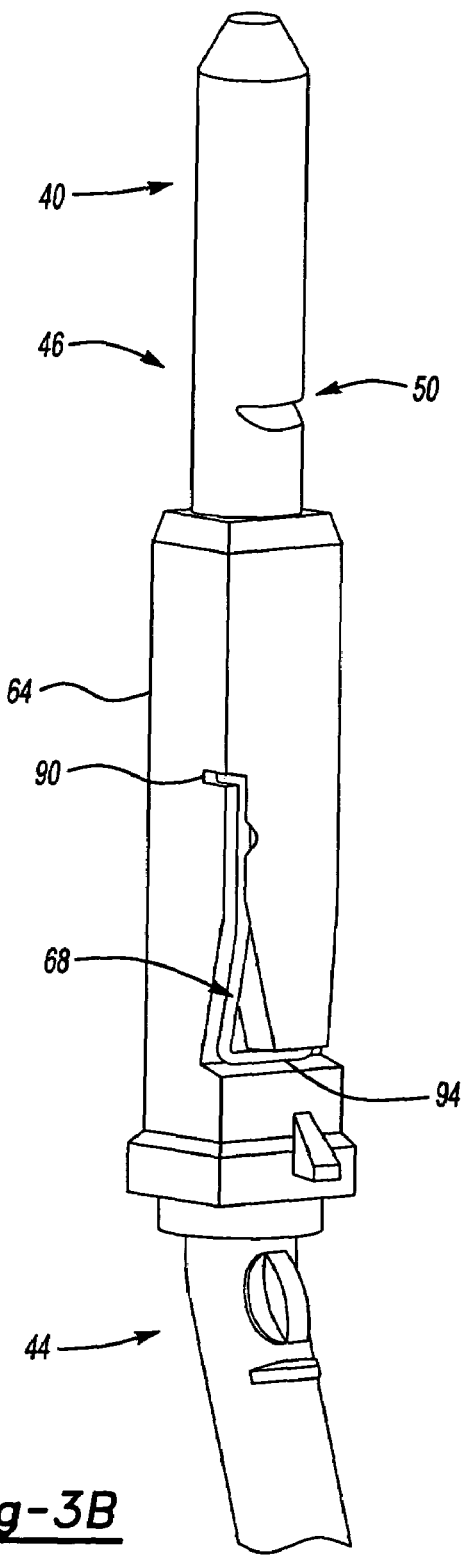

Referring to FIGS. 3a and 3b, the upper portion 46 is shown in more detail. The upper portion 46 is adapted to support the headrest assembly 42 and may include an end 48 and one or more notches 50. The notches 50 may be spaced apart in a direction extending along a center axis 52 of the upper portion 46. In addition, the notches 50 may be disposed generally parallel to each other. The notches 50 may have any suitable configuration. In the embodiment shown, each notch 50 has a generally triangular configuration that includes an upper surface 54 and a lower surface 56. The upper and lower surfaces 54,56 may be configured to permit the headrest assembly 42 to move toward the extended position and to inhibit movement of the headrest assembly 42 toward the retracted position as described in more detail below. The lower surface 56 may be disposed generally perpendicular to the center axis 52 to help inhibit movement toward the retracted position. In addition, the upper surface 54 may be disposed more parallel to the center axis 52 than the lower surface 56 and may be the longer than lower surface 56.

Figure 4:
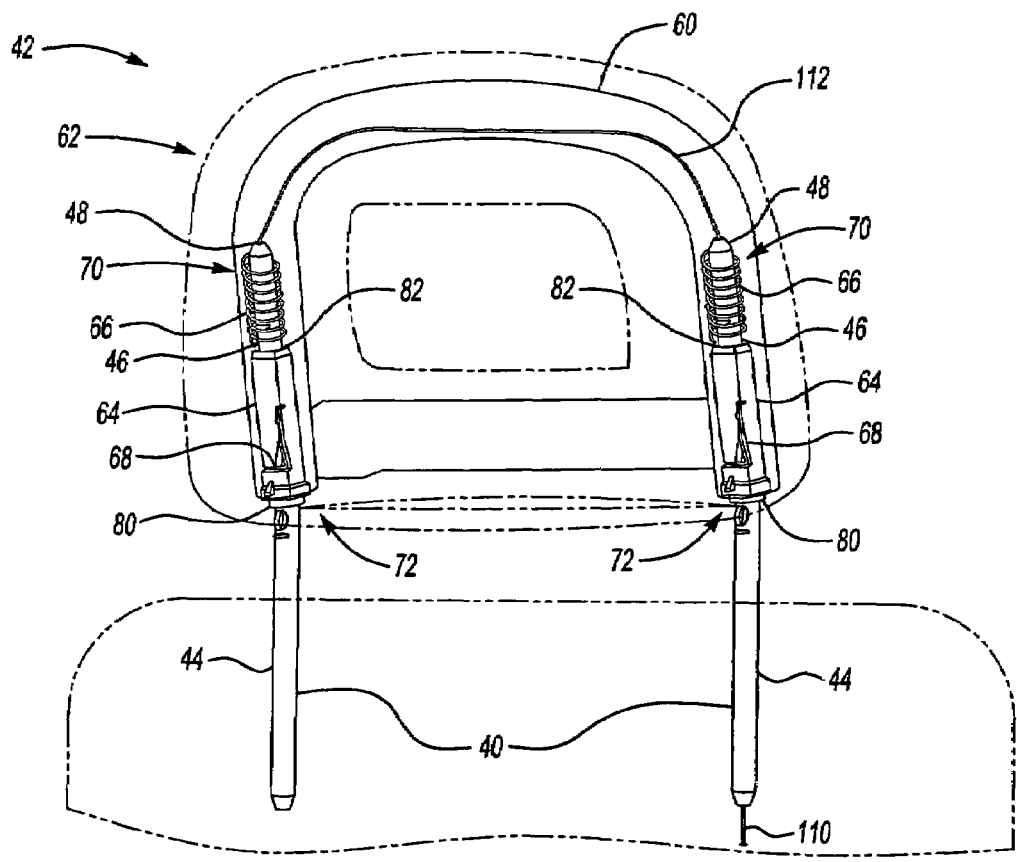
FIG. 4 is a side view of a guide and headrest support of the headrest assembly shown in FIGS. 3a and 3b.

Referring to FIG. 4, one embodiment of the headrest assembly 42 is shown. The headrest assembly 42 may include a headrest frame 60, a cushion assembly 62, one or more guides 64, one or more springs 66, and one or more latching members 68.

The headrest frame 60 may be made of any suitable material, such as a polymeric material or a metal. In addition, the headrest frame 60 may have any suitable configuration and may include one or more recesses 70. In the embodiment shown, the headrest frame 60 includes two recesses 70. Each recess 70 includes an opening 72 oriented toward the seat back 14 and an end surface 74 disposed opposite the opening 72. Each recess 70 is adapted to receive at least part of the upper portion 46 of an associated headrest support 40. In addition, each recess 70 may receive a guide 64 and a spring 66 as described in more detail below.

The cushion assembly 62 may be disposed proximate the headrest frame 60. In the embodiment shown, the cushion assembly 62 includes a cushion 76 disposed proximate the headrest frame 60 and a trim panel 78 disposed proximate an exterior surface of the cushion 76. The cushion 76 and trim cover 78 may be made of any suitable material. For instance, the cushion 76 may be made of a foam material while the trim cover 78 may be made of cloth, leather, or a polymeric material like vinyl.

With continued reference to FIG. 4, one embodiment of the guide 64 is shown in more detail. The guide 64 is at least partially disposed in the recess 70 of the headrest frame 60 and is adapted to receive at least a portion of the headrest support 40. The guide 64 may be made of any suitable material, such as a polymeric material or a metal, and may have any suitable configuration. In the embodiment shown, the guide 64 has a tubular configuration and includes inlet end 80, a distal end 82, and a side opening 84. The inlet end 80 is disposed near the opening 72 of the headrest frame 60. The distal end 82 is disposed within the recess 70 between the opening 72 and the end surface 74. The side opening 84 is disposed between the inlet and distal ends 80,82.

The latching member 68 is adapted to selectively engage a notch 50 to inhibit movement of the headrest assembly 42 toward the retracted position. The latching member 68 may have any suitable configuration and may be disposed in any suitable location. In the embodiment shown, the latching member 68 is configured as a spring clip and is disposed proximate the guide 64. More specifically, the latching member 68 is generally U-shaped and includes a first end 90, a second end 92, and a contact portion 94 disposed between the first and second ends 90,92. The contact portion 94 may extend through the side opening 84 of the guide 64 and may be angled toward the headrest support 22. Alternatively, the latching member 68 may be attached to another component of the headrest assembly 42.

Figure 6:
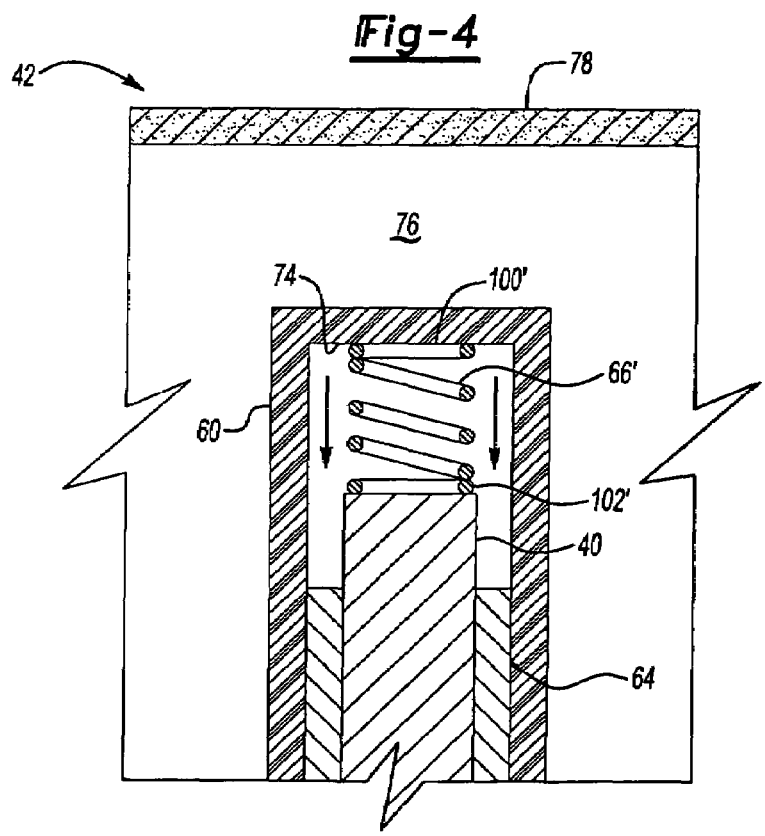
FIG. 6 is a section view of an embodiment of the headrest assembly having a tension spring.

The spring 66 is provided to bias the headrest assembly 22 toward the retracted position. The spring 66 may be of any suitable type and may have any suitable configuration. In the embodiment shown in FIG. 5, the spring 66 is a compression spring and has a first end 100 that is connected to the upper portion 46 and a second end 102 that is disposed proximate the guide 64. More particularly, the second end 102 may be disposed proximate the distal end 82 of the guide 64 or may be secured to the guide 64 between the distal end 82 and side opening 84 if sufficient clearance is provided between the recess 70 and the guide 64. In the embodiment shown in FIG. 6, the spring 66' is a tension spring and has a first end 100' and a second end 102'. The first end 100' is disposed proximate the end surface 74 of the recess 70. The second end 102' is disposed proximate the upper portion 46 of the headrest support 40. More particularly, the second end 102' may be disposed proximate the end 48 of the upper portion 46 or may be secured to the upper portion 46 between the end 48 and the notches 50 to reduce package space. The springs 66,66' may be separated from the cushion assembly 62 by the headrest frame 66, or another surface that defines a cavity wall.

One or more cables may be provided to actuate the latching member 68. In the embodiment shown, a first cable 110 and a second cable 112 are provided. The first cable 110 includes a first end 114 and a second end 116. The first end 114 is disposed proximate the latching member 68. The second end 116 is disposed proximate a portion of vehicle seat assembly 10 that does not pivot with the seat back 14, such as the seat bottom 12 or a portion of the pivot mechanism 16 disposed proximate the seat bottom 12. The first cable 110 may be routed through a headrest support 40 to help protect the first cable 110 and no interfere with movement of the headrest assembly 42. In addition, the first cable 110 may be secured to a portion of the seat back 14, such as the frame 20, with a retention clip or in any suitable manner.

The second cable 112 is provided to connect the latching members 68 associated with each headrest support 40. Of course, the second cable 112 may be omitted if a single latch mechanism is provided. The second cable 112 may be disposed in any suitable location in the headrest assembly 42, such as adjacent to or within the headrest frame 60. Optionally, the first and second cables 110, 112 may be integrally formed.

Figure 5:
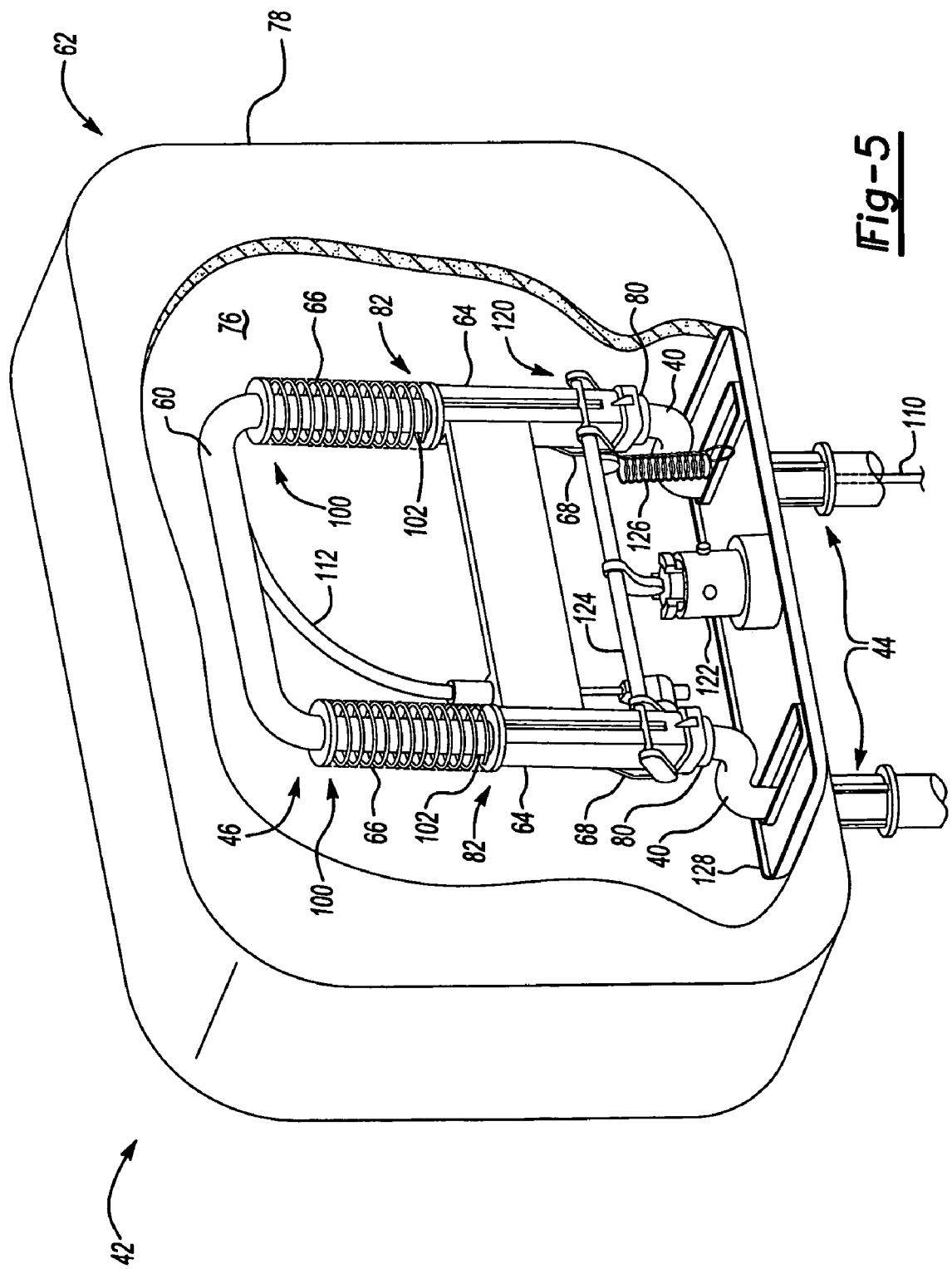
FIG. 5 is a fragmentary perspective view of another embodiment of a head restraint arrangement.

Referring to FIG. 5, a release mechanism 120 may be provided to permit manual actuation of the latching member 68. The release mechanism 120 may have any suitable configuration, such as a button, lever, linkage, or wedge. In addition, the release mechanism 120 may be disposed in any suitable location, such as proximate an exterior surface of the cushion 76 and/or trim panel 78 to facilitate ease-of-use. In the embodiment shown, the release mechanism 120 includes a release button 122, a release rod 124, and a reset spring 126. The release button 122 is configured to actuate a release rod 124. The release rod 124 may be pivotally connected to the guides 64. A reset spring 126 may be attached to the release rod 124 at a first end and attached to a cover 128 disposed proximate the headrest assembly 42 at a second end. The release spring 126 may exert a biasing force to actuate the release rod 124 toward the seat back 14. The release rod 124 is configured to move the latching member 68 away from the headrest support 40 when the release button 122 is pressed. A cavity may be provided proximate at least a portion of the release mechanism 120 to facilitate movement of the release rod 124 and/or release spring 126.

The headrest assembly 42 may be automatically actuated toward the retracted position when the seat back 14 is folded relative to the seat bottom 12. Before the seat back 14 is folded, the latching member 68 may engage a notch 50. Folding of the seat back 14 causes the first and second cables 110,112 to move. The first and second cables 110,112 then pull on their associated latching members 68, causing the latching members 68 to disengage from their respective notches. The headrest assembly 42 is then free to move toward the retracted position in response to the biasing force exerted by the spring 66,66'. Similarly, unfolding of the seat back 14 toward an upright position releases tension on the first and second cables 110, 112, thereby allowing the latching member 68 to engage the headrest support 40 and/or a notch 50.

The headrest assembly 42 may then be manually actuated toward the extended position by exerting force on the headrest assembly 42 in a direction extending away from the seat back 14. Moreover, the headrest assembly 42 may be selectively positioned between the retracted and extended positions by moving the headrest assembly 42 to engage a desired notch 50. The configuration of the notches facilitates manual actuation of the headrest assembly 42 toward the extended position, while inhibiting movement toward the retracted position when the latching member 68 is extended.

The present invention allows a headrest assembly to be automatically retracted when a vehicle seat is folded or folded and tumbled in the case of a storable vehicle seat assembly. Automatic retraction is desirable since it allows the overall height of the seat back to be reduced without manual intervention, thereby reducing the likelihood of interference between the headrest assembly and another vehicle component, such as an instrument panel, a seat disposed in front of the vehicle seat assembly, or vehicle floor. As such, the present invention improves ease of use and enhances customer satisfaction. In addition, automatic retraction is desirable in meeting manufacturer and/or government specifications, such as Federal Motor Vehicle Safety Specification 202A (FMVSS 202A). The manual adjustment capabilities of the present invention allow a headrest arrangement to be selectively positioned to improve visibility and to provide positioning tailored to a vehicle occupant.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat assembly comprising:
   a seat back having a frame;
   a moveable head restraint arrangement having a headrest support fixedly positioned relative to the frame and a headrest assembly moveably disposed on the headrest support and entirely disposed outside the seat back; and
   a latching member disposed in the headrest assembly;
   wherein the headrest assembly moves linearly toward the seat back when the latching member is spaced apart from the headrest support.

2. The vehicle seat assembly of claim 1 wherein the headrest assembly further comprises a headrest frame and a guide fixedly attached to the headrest frame.

3. The vehicle seat assembly of claim 2 wherein the headrest frame further comprises a recess and the guide is at least partially disposed in the recess.

4. The vehicle seat assembly of claim 3 further comprising a spring disposed in the recess and configured to bias the headrest assembly toward the seat back.

5. The vehicle seat assembly of claim 2 wherein the latching member is disposed proximate the guide.

6. The vehicle seat assembly of claim 2 wherein the guide further comprises a side opening and at least a portion of the latching member extends through the side opening to engage the headrest support.

7. The vehicle seat assembly of claim 1 wherein the headrest support includes a notch and the latching member is configured to selectively engage the notch to inhibit movement of the headrest assembly toward the seat back.

8. The vehicle seat assembly of claim 7 wherein the headrest support includes a linear upper portion having a center axis and the notch further comprises an upper surface and a lower surface, the lower surface being disposed at a greater angle from the center axis than the upper surface.

9. The vehicle seat assembly of claim 1 further comprising a seat bottom pivotally attached to the seat back and a cable having a first end disposed proximate the latching member and a second end disposed proximate the seat bottom, wherein the cable actuates the latching member away from the headrest support when the seat back is folded toward the seat bottom.

10. The vehicle seat assembly of claim 1 further comprising a seat bottom pivotally attached to the seat back with a pivot mechanism and a cable having a first end disposed proximate the latching member and a second end disposed proximate a portion of the pivot mechanism disposed proximate the seat bottom, wherein the cable actuates the latching member such that the latching member is spaced apart from the headrest support when the seat back is folded toward the seat bottom.

11. The vehicle seat assembly of claim 1 wherein the headrest assembly further comprises a manual release mechanism adapted to actuate the latching mechanism away from the headrest support.

12. A vehicle seat assembly comprising:
a seat bottom;
a seat back;
a pivot mechanism disposed proximate the seat bottom and the seat back and configured to allow the seat back to pivot relative to the seat bottom;
a moveable head restraint arrangement having a headrest support fixedly positioned on the seat back and a headrest assembly moveably disposed on the headrest support and disposed entirely outside the seat back;
a latching member disposed inside the headrest assembly; and
a cable attached to the latching member at a first end and attached to a portion of the pivot mechanism disposed proximate the seat bottom at a second end;
wherein the latching member moves away from the headrest support and the headrest assembly moves toward the seat back when the seat back is folded toward the seat bottom.

13. The vehicle seat assembly of claim 12 wherein the cable is routed through the headrest support.

14. The vehicle seat assembly of claim 12 wherein the headrest assembly further comprises a headrest frame, a guide fixedly attached to the headrest frame, and a spring having a first spring end disposed proximate a portion of the headrest support that extends through the guide and a second end disposed proximate the guide, the spring exerting a biasing force to actuate the headrest assembly toward the seat back.

15. The vehicle seat assembly of claim 12 wherein the headrest assembly further comprises a headrest frame having a recess that includes an end surface, and a tension spring having a first end disposed proximate the end surface and a second end disposed proximate the headrest support, the tension spring exerting a biasing force to actuate the headrest assembly toward the seat back.

16. The vehicle seat assembly of claim 12 wherein the headrest support further comprises a notch configured to inhibit movement of the headrest assembly toward the seat back when the latching mechanism engages the notch and permit movement of the headrest assembly away from the seat back.

17. A vehicle seat assembly comprising:
a seat bottom;
a seat back;
a moveable head restraint arrangement having a headrest assembly disposed entirely above the seat back and a headrest support having a lower portion-that is fixedly mounted to the seat back and an upper portion connected to the headrest assembly;
a latching member disposed in the headrest assembly; and
a cable attached to the latching member at a first end and attached to the seat bottom at a second end;
wherein the headrest assembly moves linearly along the upper portion toward the seat back when the seat back is folded toward the seat bottom.

18. The vehicle seat assembly of claim 17 wherein the headrest assembly includes a spring that exerts a biasing force to actuate the headrest assembly toward the seat back.

19. The vehicle seat assembly of claim 17 wherein the headrest support includes a set of notches adapted to receive the latching member, each member of the set of notches being spaced apart from another member of the set of notches to allow the headrest assembly to be selectively positioned when the headrest assembly is moved away from the seat back.

20. The vehicle seat assembly of claim 1 further comprising a release mechanism having a release rod pivotally disposed on headrest assembly and a release button adapted to move the release rod, wherein the release rod moves the latching member away from the headrest support when the release button is actuated.

* * * * *